(12) United States Patent
Baldwin et al.

(10) Patent No.: US 10,552,038 B2
(45) Date of Patent: Feb. 4, 2020

(54) OBJECT STORAGE ARCHITECTURE BASED ON FILE_HEAT

(71) Applicant: International Business Machines Corporation, Armonk, NY (US)

(72) Inventors: Duane M. Baldwin, Mantorville, MN (US); Sasikanth Eda, Vijayawada (IN); Guang Ya Liu, Xian (CN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/153,847

(22) Filed: May 13, 2016

(65) Prior Publication Data

US 2017/0329552 A1    Nov. 16, 2017

(51) Int. Cl.
 G06F 3/06    (2006.01)
(52) U.S. Cl.
 CPC .................................. G06F 3/0605 (2013.01)
(58) Field of Classification Search
 CPC ... G06F 3/0647; G06F 3/0649; G06F 11/1076
 See application file for complete search history.

(56) References Cited

U.S. PATENT DOCUMENTS

| 8,429,346 | B1 * | 4/2013 | Chen ..................... G06F 3/0613 709/213 |
| 8,918,613 | B2 | 12/2014 | Kato et al. |
| 8,954,671 | B2 | 2/2015 | Maki et al. |
| 2011/0213928 | A1 * | 9/2011 | Grube ................. G06F 11/1076 711/E12.103 |
| 2013/0339567 | A1 * | 12/2013 | Carpentier .......... G06F 11/0709 711/4 |
| 2013/0339818 | A1 * | 12/2013 | Baker ..................... G06F 11/10 714/763 |

FOREIGN PATENT DOCUMENTS

CN    104462577 A    3/2015

OTHER PUBLICATIONS

Coyne et al.; "IBM Linear Tape File System Enterprise Edition V1.1.1.2: Installation and Configuration Guide"; IBM Redbooks; Jan. 29, 2015; 322 pages.
Rouse; "Definition: erasure coding"; TechTarget; SearchStorage; Nov. 2014; 4 pages; <http://searchstorage.techtarget.com/definition/erasure-coding>.

* cited by examiner

Primary Examiner — Edward J Dudek, Jr.
Assistant Examiner — Andrew Russell
(74) Attorney, Agent, or Firm — Michael A. Petrocelli

(57) ABSTRACT

Embodiments of the present invention disclose methods and systems for object storage. Migration policies and an algorithm applied by the module facilitates the migration of files (i.e., object replicas or erasure code fragments) from one storage to another storage. The FILE_HEAT is monitored over a period of time. If the FILE_HEAT of a file increases over a period of time relative to the other files, the file is migrated to a higher level storage. Files can be migrated to a higher level storage even if the FILE_HEAT of a file decreases over a period of time.

14 Claims, 9 Drawing Sheets

OBJECT STORAGE ARCHITECTURE BASED ON FILE_HEAT

BACKGROUND OF THE INVENTION

The present invention relates generally to the field of data storage and more specifically to object storage architecture based on file heat.

Object storage is a term describing an approach to manipulating and addressing discrete units of storage called objects. Every object exists at the same level in a flat space referred to as a storage pool. One object cannot be placed inside another object. Objects have metadata associated with the data the objects contain and are characterized by extended metadata. A unique identifier, which is assigned to each object, allows a server or end user to retrieve the object without needing to know the physical location of the object. Object storage is designed to offer simplified management of metadata schemes, more scalable metadata schemes, and a method to store unstructured data.

SUMMARY

According to one embodiment of the present invention, a method for object storage is provided, comprising: connecting, by one or more processors, a plurality of files to an application, wherein the application manipulates an object; connecting, by one or more processors, the application to a plurality of tiered storage levels; monitoring, by one or more processors, heat values of a replica of the object, a plurality of erasure codes, and a parity of the object; and migrating, by one or more processors, the plurality of files according to a migration policy, to the plurality of tiered storage levels corresponding to the object based on a heat value of the plurality of files associated with the object.

Another embodiment of the present invention provides a computer program product for object storage, based on the method described above.

Another embodiment of the present invention provides a computer system for object storage, based on the method described above.

DETAILED DESCRIPTION

Certain storage players use clustered file systems as the back-end storage for object storage (as opposed to using ext3, ext4, and xfs type file system). These storage players which use clustered file systems bring in the traditional advantages (such as backup, replication, consistency, locking, better metadata handling etc.) of the clustered file system to object storage architecture. An application is performing read/write operations directly on: (i) a traditional object storage architecture built on FILE_HEAT supported clustered back-end storage; or (ii) an erasure code object storage architecture built on FILE_HEAT supported clustered back-end storage. The traditional object or the erasure code object is stored on a first node; later replicated to a second node or a third node; and migrated to a first storage tier. The traditional object or the erasure code object, which is residing in the first tier storage, can become corrupted. The application makes a request for the traditional object or the erasure code object, a proxy server chooses the second node to serve the request and needs to be retrieved from a second tier storage or a third tier storage. The second node, the second tier storage, and third tier storage do not perform as efficiently as the first node and the first tier storage. Thus, the application performance is decreased and a longer duration of time is required. The request for the traditional object or the erasure code object is fulfilled by using a less efficient storage node and retrieving the traditional object or the erasure code objects by using a less efficient storage tier. The present invention discloses methods and systems to improve application performance (I/O) when performing read/write operations directly to erasure code object storage architecture built on FILE_HEAT supported clustered back-end storage.

Figure 1:
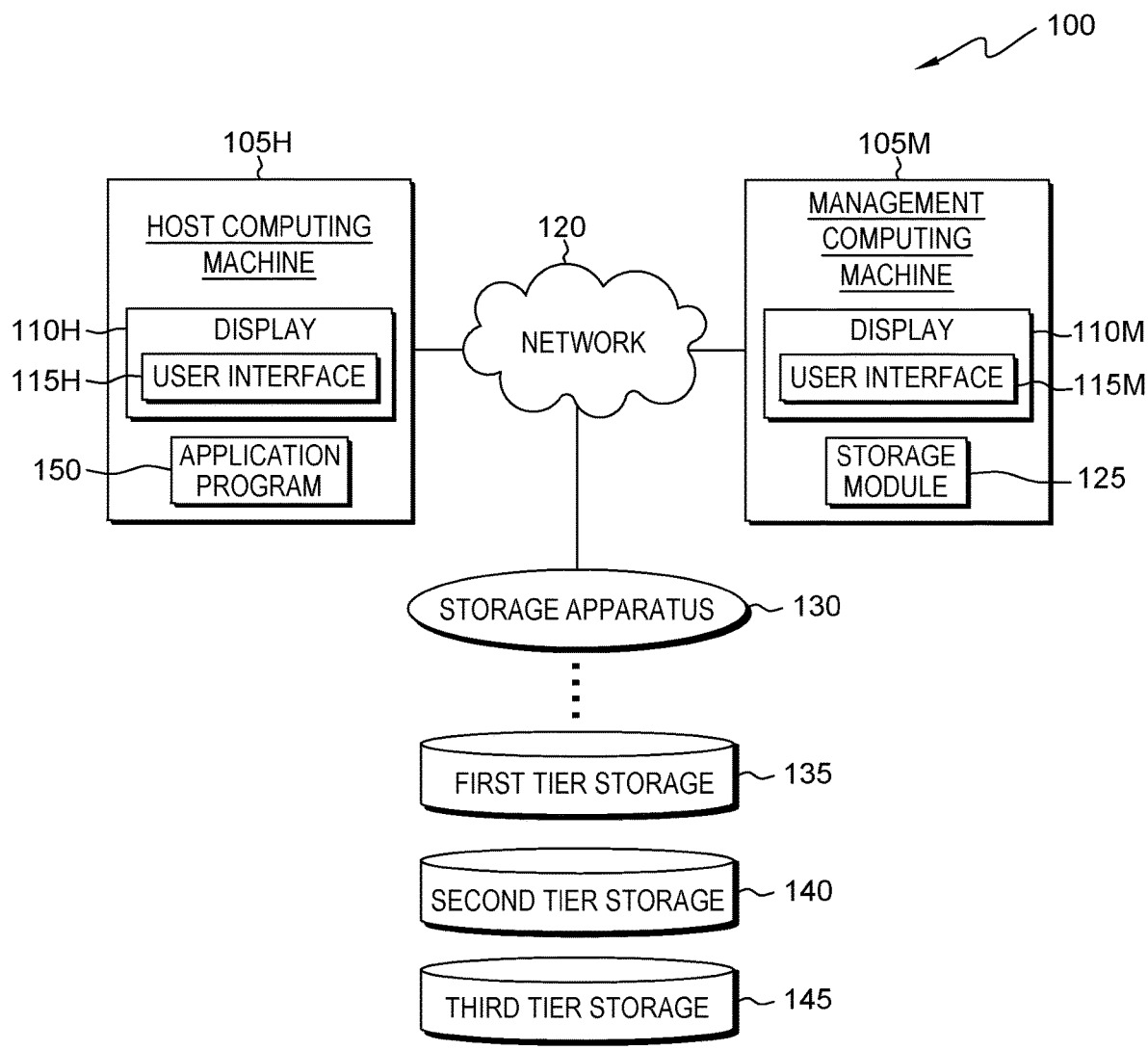
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes host computing machine 105H, management computing machine 105M, and storage apparatus 130 connected by network 120.

Management computing machine 105M contains display 110M. Storage module 125 and user interface 115M may be visible to the end-user of management computing machine 105M. Storage module 125 and user interface 115M reside within management computing machine 105M. Management computing machine 105M facilitates the control of the tiered storage (first tier storage 135, second tier storage 140, and third tier storage 145), which has been executed by storage apparatus 130, by sending out I/O requests with the aid of storage module 125. Management computing machine 105M may be a laptop computer, a tablet computer, a netbook computer, a personal computer (PC), a desktop computer, a personal digital assistant (PDA), a smart phone, a thin client, or any programmable electronic device capable of communicating with storage module 125 and application program 150. Management computing machine 105M may include internal and external hardware components, as depicted and described in further detail with respect to FIG. 9.

Host computing machine 105H contains display 110H. Application program 150 and user interface 115H may be visible to the end-user of host computing machine 105H. Application program 150 and user interface 115H reside within host computing machine 105H. Host computing machine 105H receives instruction from management computing machine 105M and accesses data in the logical volumes by using storage apparatus 130. Host computing machine 105H may be a laptop computer, a tablet computer, a netbook computer, a personal computer (PC), a desktop computer, a personal digital assistant (PDA), a smart phone, a thin client, or any programmable electronic device capable of communicating with storage module 125 and application program 150. Host computing machine 105H may include internal and external hardware components, as depicted and described in further detail with respect to FIG. 9.

In this exemplary embodiment, displays 110M and 110H may be composed of, for example, a liquid crystal display screen, an organic light emitting diode display screen, or other types of display screens. A user can use the touch screen of display 110M or 110H to manipulate content by moving or sharing content. Displays 110M and 110H contain user interface (UI) 115M and 115H, respectively.

User interfaces 115M and 115H are user interfaces residing in management computing machine 105M and host computing machine 105H, respectively. User interfaces 115M and 115H may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interfaces 115M and 115H are capable of receiving data, user commands, and data input modifications from a user and is capable of communicating with storage module 125 and application program 150.

Application program 150 resides in host computing machine 105H. Object storage enables a programmatic version of user interface 115H to allow application program 150 to manipulate data and metadata. At the base level, application program 150 performs basic reading, writing, and deleting operations. Some object storage implementations allows application program 150 to permit object versioning, object replication, and the movement of object between different tiers and types of storage (i.e., movement of the object between first tier storage 135, second tier storage 140, and third tier storage 145).

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between management computing machine 105M, host computing machine 105H, and storage apparatus 130.

Figure 2:
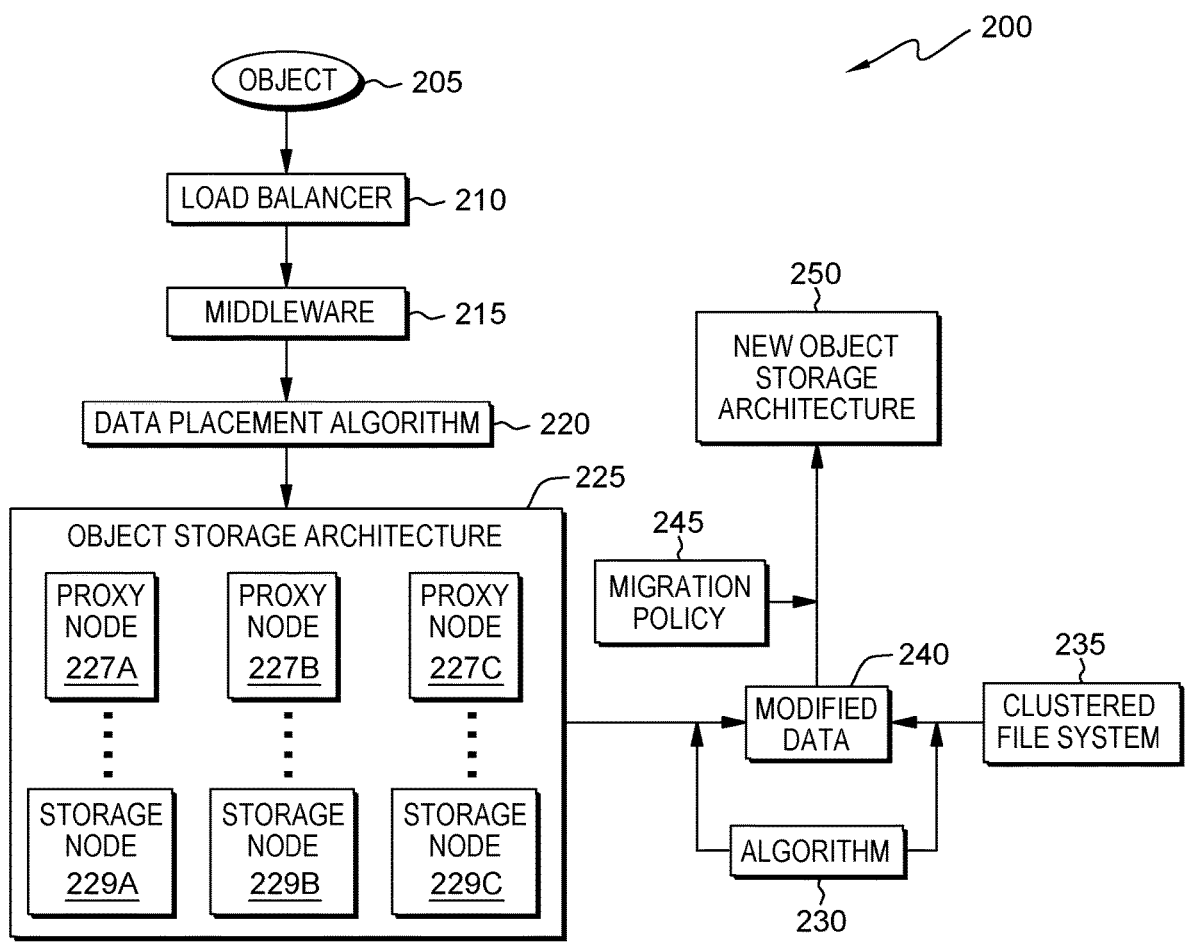
FIG. 2 is a functional block diagram illustrating the treatment of erasure codes of a single object with a data placement algorithm and a migration policy, in accordance with an embodiment of the present invention.

Storage module 125 resides in management computing machine 105M. In one embodiment, storage module 125 is an application/patch which can be inserted into management computing machine 105M and improves the performance of application program 150. Storage module 125 provides a provision of a framework and an algorithm which performs the following: integrating storage module 125 with a clustered file system; treating erasure codes of a single object distributed across various nodes as a unique data stream; and applying a migration policy according to highest access temperature recorded for an erasure code fragment. Algorithm 230 (which is depicted in FIG. 2) helps identify the workload category and determines whether the file system is used for traditional full replica object storage architecture or whether the file system is used for erasure coded object storage architecture, based on the application read/write patterns. Erasure coding is a method of data protection in which data is broken into fragments, expanded, and encoded with redundant data pieces and stored across a set of different locations or storage media. If the identified pattern corresponds to a traditional full replica object storage architecture, algorithm 230 keeps track of the original object along with the replicas of the original object stored across other nodes. Similarly, if the identified pattern corresponds to an erasure code object storage architecture, the proposed algorithm keeps track of the erasure code (EC) fragments spread across various nodes corresponding to a single object. Based on migration policy 245 installed over clustered file system 235, the information life cycle policies of clustered file system 235 (which can be embedded with clustered file system 235 or can be third party tools) identifies the object and erasure code fragments which are spread across various nodes. Algorithm 230 assists in the migration of: the original objects, the EC fragments which are hot to faster storage tiers, the replica of the original objects, EC fragments to faster storage tier (even if the EC fragment access temperature is not hot) in relation to the original hot object and/or EC fragments. The framework in conjunction with algorithm 230 places the snapshots, clones, versioning of the objects, EC fragments according to their respective storage tier even though the access temperature of the EC fragments is below the installed migration policy. Furthermore, storage module 125 can be applied for: object storage; cloud computing services (i.e., storage and cloud service delivery); and network attached storage object I/O processing.

Storage apparatus 130 provides a storage environment by implementing tiered data storage. Storage apparatus 130 is connected to management computing machine 105M and host computing machine 105H. In one embodiment, storage apparatus 130 allows the automated progression or demotion of data across different tiers (types) of storage devices and media. The movement of data takes place in an automated way with the aid of software (i.e., application program 150 and storage module 125) or embedded firmware and is assigned to the related media according to performance and capacity requirements. More advanced implementations include the ability to define rules and policies (i.e., migration policy 245) which dictates if and when data can be migrated between the tiers, and in many cases provides the ability to pin data to tiers permanently or for specific periods of time. Implementations vary, but are classed into two broad categories: pure software based implementations which are run on general purpose processors supporting most forms of general purpose storage media and embedded automated tiered storage which is controlled by firmware as part of a closed embedded storage system such as a SAN disk array. Software Defined Storage architectures commonly include a component of tiered storage as part of their primary functions.

First tier storage 135, second tier storage 140, and third tier storage 145 are components of the storage environment provided by storage apparatus 130. First tier storage 135 is the highest performing systems when implementing tiered data storage; second tier storage 140 is an intermediate level performing systems when implementing tiered data storage; and third tier storage 145 is the lowest performing systems when implementing tiered data storage. The most important data is stored within first tier storage 135 while less important data is stored within second tier storage 140 and third tier storage 145. Data can migrate between first tier storage 135, second tier storage 140, and third tier storage 145.

FIG. 2 is a functional block diagram illustrating the treatment of erasure codes of a single object with a data placement algorithm and a migration policy, in accordance with an embodiment of the present invention.

Object 205 is an instance of a class (i.e., a part of a computer program created by a programmer to represent object 205 in a mode by which computing devices can process data). Object 205 contains data and ways to manipulate the contained data. Interfaces are well-specified mechanisms which are applied to manipulate the contained data. Design patterns of object 205 provide a usable template to address a common problem. Some types of object 205 are: an object with a single method (i.e., a function object); an object set up with a fixed state upon creation and does not change after the creation time (i.e., an immutable object); an object used without restriction (i.e., a first-class object); an object that can contain other objects (i.e., a container object); an object with the purpose of creating other objects (i.e., a factory object); an object from which other objects can be created (i.e., a metaobject); a specialized metaobject from which other objects can be created by copying functions (i.e., a prototype object); an object which is only an instance of the object's class during the lifetime of the program (i.e., a singleton object); and an object which produces a stream of outputted data based on a stream of inputted data. (Note: Other types of object 205 are possible.) Object 205 may be applied to enable a distributed software system. In the distributed software system, components located within a networked computers communicate and coordinate actions of the distributed software system by passing messages among these components.

Load balancer 210 distributes workloads (i.e., requests for one or more computing devices to complete one or more desired functions) across multiple computing resources. Load balancer 210 aims to optimize resource use, maximize throughput, and avoid the overloading of any single resource by dividing traffic between network interfaces on a network socket. Load balancer 210 may use dedicated software and hardware units to distribute the workloads. Load balancer 210 may have a variety of special features. For example, HTTP compression reduces the amount of data transferred for a HTTP-version of object 205 by utilizing gzip compression available in certain web browsers. The more pronounced the response is to a triggering condition, the more the HTTP compression feature of load balancer 210 can improve response times of the computing device to meet the workload demanded by the client.

Middleware 215 is a computer software which provides services to software applications (i.e., application program 150 in FIG. 1) beyond those available from the operating system. Middleware 215 often enables interoperability between applications which run on different operating systems, by supplying services such that the application can exchange data in a standards-based way. Middleware 215 is located "in the middle" between an application software which may be working on different operating systems. Middleware 215 is similar to the middle layer of a three-tier single system architecture, except that middleware 215 is stretched across multiple systems or applications. Examples of middleware 215 include EAI software, telecommunications software, transaction monitors, and messaging-and-queueing software. Different prototypes of middleware 215 enable different types of functionalities. In an exemplary embodiment, middleware 215 is an object request broker, which allows application program 150 to migrate object 205 and request services in an object-oriented system.

Data placement algorithm 220 behaves as a ring structure. The ring structure determines where data should reside within a cluster of computing devices/resources. There are separate ring structures for account databases, container databases, and individual object storage policies (i.e., a storage policy for object 205). These separate ring structures operate in the same manner and are externally managed. Ring structures use a configurable amount number of bits from a path's MD4 hash as a partition index that designates a device. The number of bits kept from the hash is known as the partition power. Partitioning the full MD5 hash ring allows other parts of the cluster to work in batches of items in a concomitant manner. This results in a more efficient cluster or at least a less complex cluster than working with each item separately or the entire cluster all at once. Another configurable value is the replica count, which indicates how many of the partition to device assignments comprise a single ring structure. For a given partition number, each replica is assigned to a different device in the ring structure. Devices are added to the ring to describe the capacity available for the part-replica assignment. Devices are placed into failure domains consisting of a region, a zone, and a server. Regions may be used to describe geographically systems characterized by lower-bandwidth or higher latency between machines in different regions. Many ring structures contains only a single region. Zones may be used to group devices based on physical locations, power separations, network separations, or any other attribute which reduces the possibility of rendering multiple replicas as being unavailable at the same time. Devices are given a weight which describes the relative weight of the device in comparison to other devices. When building a ring structure, replicas of all of the parts are assigned to devices according to the device weight. Additionally, each replica of a part will attempt to be assigned to a device, wherein the failure domain does not already have a replica for the part. Only a single replica of a part may be assigned to each device and thus, there must be as many devices as replicas.

Object storage architecture 225 is an object storage environment with two entities/node groups. In one embodiment, object storage architecture 225 demonstrates an example of a traditional object storage architecture which comprises of two entities/node groups. One node group is referred to as proxy nodes. Proxy nodes 227A, 227B, and 227C are used for a distributed load handling and requests handling nodes into the namespace and the other node group referred to as "storage nodes." Storage nodes 229A, 229B, and 229C are responsible for writing into disks/storage subsystems. The architecture of storage nodes 229A-C serves as a storage unit/repository. In this architecture, the "user uploaded/PUT version" of object 205 is completely stored on a single node while the replicas of object 205 are spread across the other nodes. In another embodiment, object storage architecture 225 demonstrates the erasure code object storage architecture which comprises two entities/node groups (e.g., proxy nodes 227A-C and storage nodes 229A-C). When object storage architecture 225 is an instance of the erasure code object storage architecture, the functionalities of node groups are the same as the embodiment demonstrating traditional object storage. The architecture of the "user uploaded/PUT version" of object 205 is split into data segments. Each segment is encoded using erasure code schema which results in multiple data, parity fragments. Each fragment is written to a single node resulting in the distribution of erasure codes of object 205 across all nodes.

Clustered file system 235 is a file system which is shared by being simultaneously mounted on multiple servers. There are several approaches to clustering, most of which do not employ a clustered file system (only direct attached storage for each node). Clustered file system 235 may provide features such as location-independent addressing and redundancy functions, which improve reliability or reduce the complexity of the other parts of the cluster. Parallel file systems are a type of clustered file system that spread data across multiple storage nodes, usually for redundancy or performance functions.

Modified data 240 is resultant data which treats erasure codes and traditionally replications of object 205 distributed across various nodes as a unique data stream. Storage module 125 applies algorithm 230 on object storage architecture 225 and clustered file system 235 to furnish modified data 240. Storage module 125 then applies migration policy 245 onto modified data 240 to furnish new object storage architecture 250.

Algorithm 230 is applied by storage module 125 in order to identify the workload category based on identified reading/writing patterns of application program 150. Algorithm 230 determines whether the contents of object storage architecture 225 and clustered file system 235 are used for traditional full replica object storage architecture or erasure coded object storage architecture in order to identify the reading/writing patterns of application program 150. In one embodiment algorithm 230 keeps track of the original object (i.e., object 205) along with replicas of object 205 stored across other nodes (i.e., objects stored on storage nodes 229A-C) upon identifying the pattern corresponding to a traditional full replica object storage architecture. In another embodiment, algorithm 230 keeps track of the erasure code fragments spread across various nodes (i.e., objects stored on storage nodes 229A-C) corresponding to a single object (i.e., object 205) upon identifying the pattern corresponding to an erasure code object storage architecture. Algorithm 230 helps treat erasure codes of a single object distributed across various nodes to furnish a unique data stream (which is modified data 240) in order to enhance the efficiency of application program 150 to fulfill requests for an erasure code. Furthermore, the application of migration policy 245 on nodes is used to enhance the efficiency of application program 150 to fulfill requests for an erasure code, according to highest file access temperature recorded for an erasure code fragment.

Migration policy 245 is applied by storage module 125 on modified data 240. In one embodiment of data processing environment 100, management computing machine 105M, host computing machine 105H, and storage apparatus 130 are components which all reside on the same machine. In this embodiment, migration policy 245 can exist and be applied on all three components. In another embodiment of data processing environment 100, management computing machine 105M, host computing machine 105H, and storage apparatus 130 are components which do not all reside on the same machine. In this another embodiment, migration policy 245 may be applied at storage apparatus 130. In an exemplary embodiment, a general parallel file system supports ILM (Information Life Cycle Management) policies in order to monitor how frequently a file is accessed. Migration policy 245 utilizes FILE_HEAT based migration, which is based on a file's access temperature. The file's access temperature is an attribute for a policy that provides a means of optimizing tiered storage. The file's access temperature is a relative attribute, which indicates whether a file is "hotter" or "colder" than the others in the pool. Migration policy 245 may be used to migrate hotter files to higher tiers and colder files to lower. The file's access temperature is an exponential moving average of the accesses to the file. As files are accessed, the temperature increases. As files are not accessed as frequently or files are no longer accessed, the file cools. The file's access temperature is intended to optimize non-volatile storage and not memory usage. Thus, cache hits are not counted. In a similar manner, only user accesses are counted.

New object storage architecture 250 is the resultant data of migrated entities after storage module 125 applies migration policy 245 on modified data 240. Algorithm 230 helps the migration of object 205 and "hot" erasure code fragments to a faster storage tier. This migration is accompanied with the migration of the replica objects (i.e., storage nodes 229A-C) and erasure code fragments to a faster storage tier even if the access temperature is not "hot" in relation to the original hot object 205 and "hot" erasure code fragments.

The proposed framework of storage module 125 works in conjunction with algorithm 230 to place the snapshots, clones, versions of object 205, and erasure code fragments according to respective storage tiers even if the access temperature of these entities is below the access temperature at an earlier time. Storage module 125 aims to remedy the at least two scenarios (described below) due to built-in ILM policies.

Scenario 1: Application program 150 is performing read/write (I/O) directly to a traditional object storage architecture embodiment of object storage architecture 225 built on FILE_HEAT supported clustered back-end migration. If user uploads object 205, object 205 is initially stored on storage node 229A and later replicated to storage node 229B and storage node 229C. Each time, proxy nodes 227A-C chooses the best storage node (among storage nodes 229A-C) to serve the request based on a request from application program 150. If storage node 229A provides better a response time than storage nodes 229B and 229C, the FILE_HEAT of object 205 at storage node 229A increases and is migrated to first tier storage 135 whereas other replicas of object 205 becomes colder and are migrated to second tier storage 140 or third tier storage 145. Object 205 residing on first tier storage 135 becomes corrupted. Reconstruction of the corrupted version of object 205 using the other replicas is pending and in progress. During this time, application program 150 makes a request for object 205. Proxy nodes 227A-C chooses another storage node aside from storage node 229A (i.e., storage node 229B or storage node 229C) for serving this request and object 205 needs to be retrieved from lower storage tier (i.e., second tier storage 140 and third tier storage 145). This takes a longer time for application program 150 to read and process, and thus, results in poor performance of application program 150 and a poor end-user experience.

Scenario 2: Application program 150 is performing read/write (I/O) directly to an erasure code object storage of object storage architecture 225 built on FILE_HEAT supported clustered back-end migration. If user uploads object 205, object 205 is fragmented and stored on storage node 229A (EC1), storage node 229B (EC2), and storage node 229C (EC3). Each time, proxy nodes 227A-C chooses the best storage node (among storage nodes 229A-C) to serve the request based on a request from application program 150. Storage node 229A and storage node 229C provide a better response than other nodes. As the FILE_HEAT of the fragments of object 205 at storage node 229A and storage node 229C (assuming two fragments are sufficient to reconstruct the object) increases, these fragments (i.e., EC1 and EC3) are migrated to first tier storage 135, whereas EC2 becomes colder and is migrated to second tier storage 140 or third tier storage 145. EC1 residing on first tier storage 135 becomes corrupted. Reconstruction of the corrupted EC1 using the other replicas is pending and in progress. During this time, application program 150 makes a request for EC2. Proxy nodes 227A-C chooses another storage node aside from storage node 229A (i.e., storage node 229B or storage node 229C) for serving this request and EC2 needs to be retrieved from lower storage tier (i.e., second tier storage 140 and third tier storage 145). This takes longer time for application program 150 to read and process, and thus, results in poor performance of application program 150 and a poor end-user experience.

Figure 3:
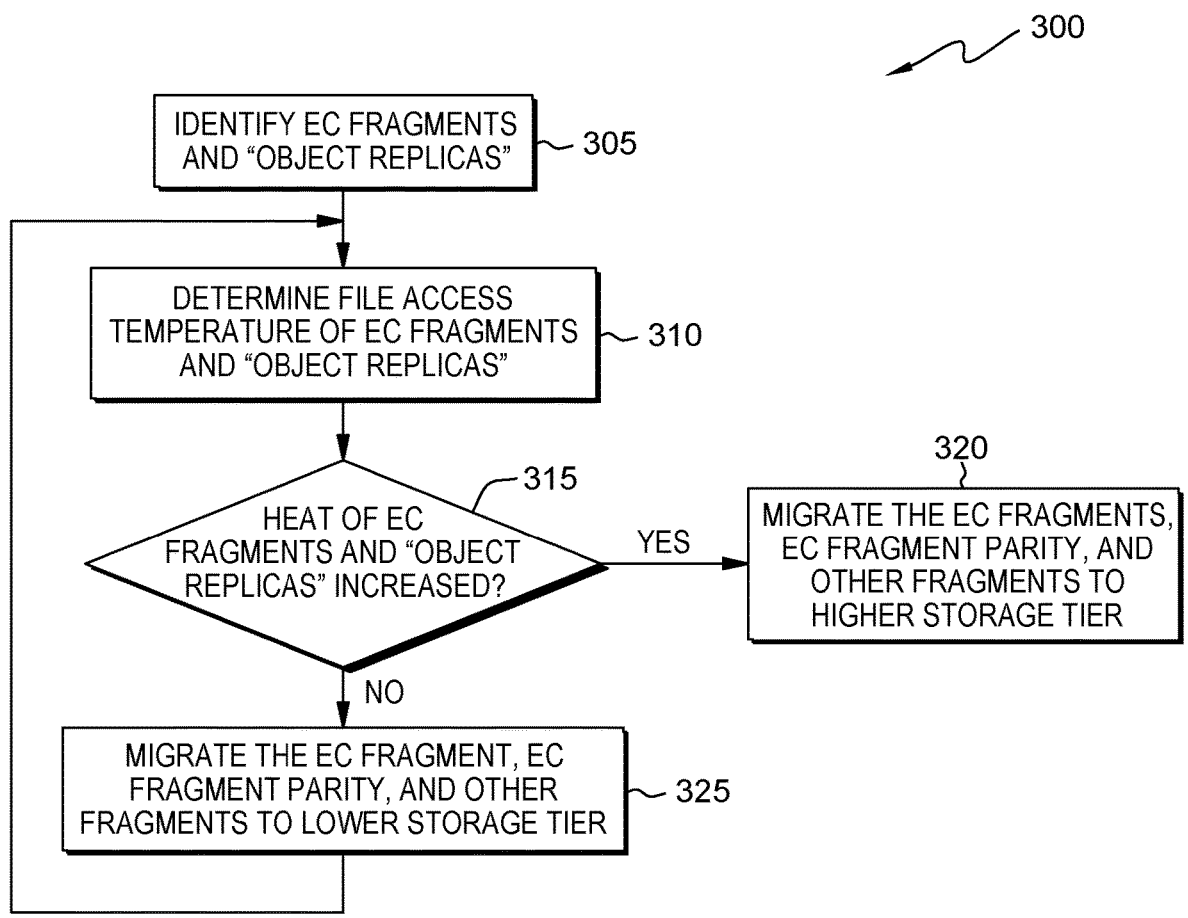
FIG. 3 is a flowchart depicting the operations performed by the invention, in accordance with an embodiment of the present invention.

FIG. 3 is a flowchart depicting the operations performed by the invention, in accordance with an embodiment of the present invention.

Environment 300 uses storage module 125, algorithm 230, and migration policy 245 in conjunction with each on object 205 to migrate object replicas (of object 205) and erasure code (EC) fragments. The term, "object replicas", is used herein to imply object replicas of object 205.

Storage module 125 identifies EC fragments and "object replicas" (305) by invoking algorithm 230. Algorithm 230 identifies EC fragments and "object replicas" based on the metadata of EC fragments and "object replicas." In some instances, there are different storage paths for EC fragments and "object replicas." Algorithm 230 identifies the workload category based on the application read/write patterns. Algorithm 230 determines whether clustered file system 235 is used for traditional full replica object storage architecture or whether the file system is used for erasure coded object storage architecture. If the identified pattern corresponds to a traditional full replica object storage architecture, algorithm 230 keeps track of object 205 along with its replicas stored across other nodes. Similarly if the identified pattern corresponds to an erasure code object storage architecture, the proposed algorithm 230 keeps track of the (EC) fragments spread across various nodes corresponding to object 205.

Storage module 125 determines the file access temperature of EC fragments and "object replicas" (310) by invoking algorithm 230. The file access temperature is an exponential moving average of the accesses to the file. Furthermore, the file access temperature is used to determine the heat of the EC fragments and/or "object replicas". The heat is a numeric value assigned to a file which is used to determine relative temperatures of the files. A file is "hotter" when the heat value of a file unit among the EC fragments and/or "object replicas" is higher than another file with a lower heat value. Likewise, a file is "colder" when the heat value of a file unit among the EC fragments and/or "object replicas" is lower than another file with a higher heat value. Based on a preconfigured heat threshold, a file may be characterized as "cold" for not exceeding the preconfigured heat threshold or a file may be characterized as "hot" for exceeding the preconfigured heat threshold.

Storage module 125 determines if heat of the EC fragments and "object replicas" increases (315) by invoking algorithm 230 and migration policy 245. Algorithm 230 and migration policy 245 of clustered file system 235 identify "object replicas" and erasure code fragments as "hot" or "cold." Algorithm 230 determines the change in the heat of the EC fragments and "object replicas." The heat can either increase (i.e., a file is "hotter") or decrease (i.e., a file is "colder").

Storage module 125 migrates the EC fragments, EC fragment parity, and other fragments to a higher storage tier upon determining the heat of the EC fragments and "object replicas" increases (320) by invoking algorithm 230 and migration policy 245. Algorithm 230 helps migrate the original objects and EC fragments which are hot to a faster storage tier. Along with these original objects and EC fragments, the replica objects and EC fragments migrate to a faster storage tier related to the original hot object and/or EC fragments (even if the heat of the replica objects and EC fragments have not increased).

Storage module 125 does not migrate the EC fragments, EC fragment parity, and other fragments to a higher storage tier upon determining the heat of the EC fragments and "object replicas" has not increased (325) by invoking algorithm 230 and migration policy 245. Algorithm 230 helps migrate the original objects and EC fragments to a lower storage tier. The heat of the EC fragments, EC fragment parity, and other fragments is not relatively "hotter" and thus, the EC fragments, EC fragment parity, and other fragments are not migrated to a higher storage tier. Storage module 125 reverts back to operation 310 to determine the file access temperature of the EC fragments, EC fragment parity, and other fragments.

Figure 4:
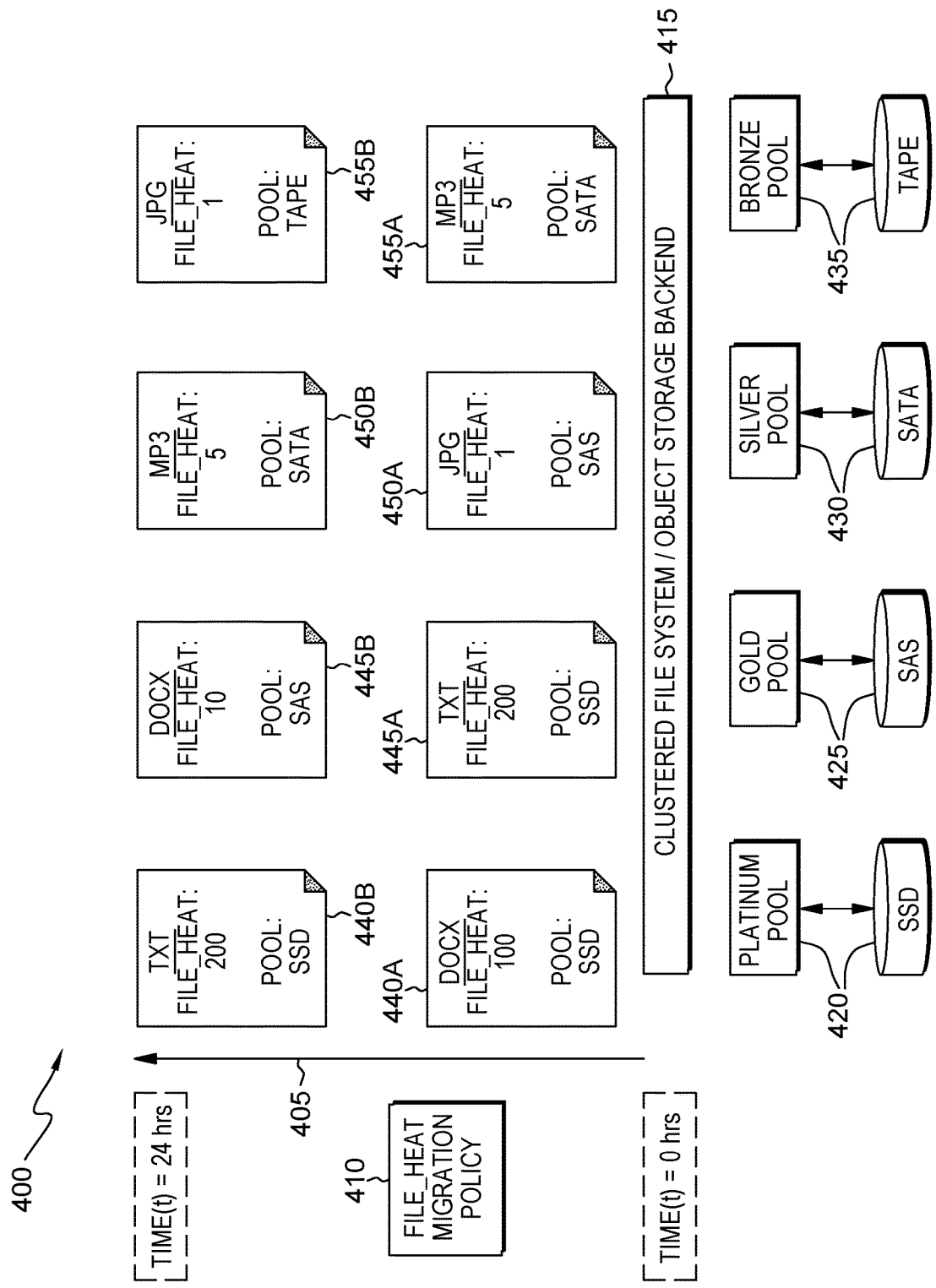
FIG. 4 is a functional block diagram illustrating migration where colder data is migrated to external tiers and the hotter data is migrated to fast tiers, in accordance with an embodiment of the present invention.

FIG. 4 is a functional block diagram illustrating migration where the colder data is migrated to external tiers and the hotter data is migrated to fast tiers, in accordance with an embodiment of the present invention.

More specifically, a typical example demonstrating FILE_HEAT based migration where colder data is migrated to external tiers and hotter data is migrated to a faster tier, is designated as environment 400.

Environment 400 includes: (i) a set of data files (i.e., files 440, 440, 445, and 455); (ii) a data/object storage platform (i.e., cluster file system/object storage backend 415); (iii) time axis 405 from Time=0 hrs to Time=24 hrs; (iv) a migration policy (i.e., FILE_HEAT migration policy 410); and storage tiers (i.e., tier 420, tier 425, tier 430, and tier 435).

In FILE_HEAT based migration, there typically exists a monitoring interval (which is 24 hrs in this example). During this monitoring interval, the access rate per file is monitored. Files with a higher FILE_HEAT (i.e., the higher access rate) when compared to other files, are migrated to a faster storage tier.

The storage tiers within environment 400 vary in tier level where the relative speed of the tiers is: tier 420 (fastest storage tier)>tier 425>tier 430>tier 435 (slowest storage tier). Tier 420 (i.e., the fastest storage tier) is associating a platinum pool to SSD storage. Tier 425 is associating a gold pool to SAS storage. Tier 430 is associating a silver pool to SATA storage. Tier 435 is associating a bronze pool to TAPE storage.

File 440A refers to file 440 when processed at an initial time whereas file 440B refers to file 440 when processed after 24 hours after the initial time. File 445A refers to file 445 when processed at an initial time whereas file 445B refers to file 445 when processed after 24 hours after the initial time. File 450A refers to file 450 when processed at an initial time whereas file 450B refers to file 450 when processed after 24 hours after the initial time. File 455A refers to file 455 when processed at an initial time whereas file 455B refers to file 455 when processed after 24 hours after the initial time.

At the initial time, based on the data placement logic of a file system (which can be user programmable and file placement depends on access frequency, file type, etc.), file 440A is placed on tier 420, file 445A is placed on tier 420, file 450A is placed on tier 425, and file 455A is placed on tier 430. At the time 24 hours past the initial time, file 440B is placed on tier 420, file 445B is placed on tier 425, file 450B is placed on tier 430, and file 455B is placed on tier 435. At the time 24 hours past the initial time, file 440B's FILE_HEAT is relatively compared to the change in FILE_HEAT of the other example files depicted in FIG. 4. File 445B's FILE_HEAT is reduced (when compared relatively to all of the other files). Based on the FILE_HEAT decrease, file 445B is migrated to tier 425 from tier 420 (i.e., migrating to a slower tier). As time progresses, the rate of accessing a file changes. Thus, the FILE_HEAT may increase or decrease as time progresses. File 440B remains in the fastest tier 420, whereas file 445B migrates to a slower tier 425 from tier 420, file 455B migrates to a slower tier 435 from tier 430, and 450B remains in tier 430.

Figure 5:
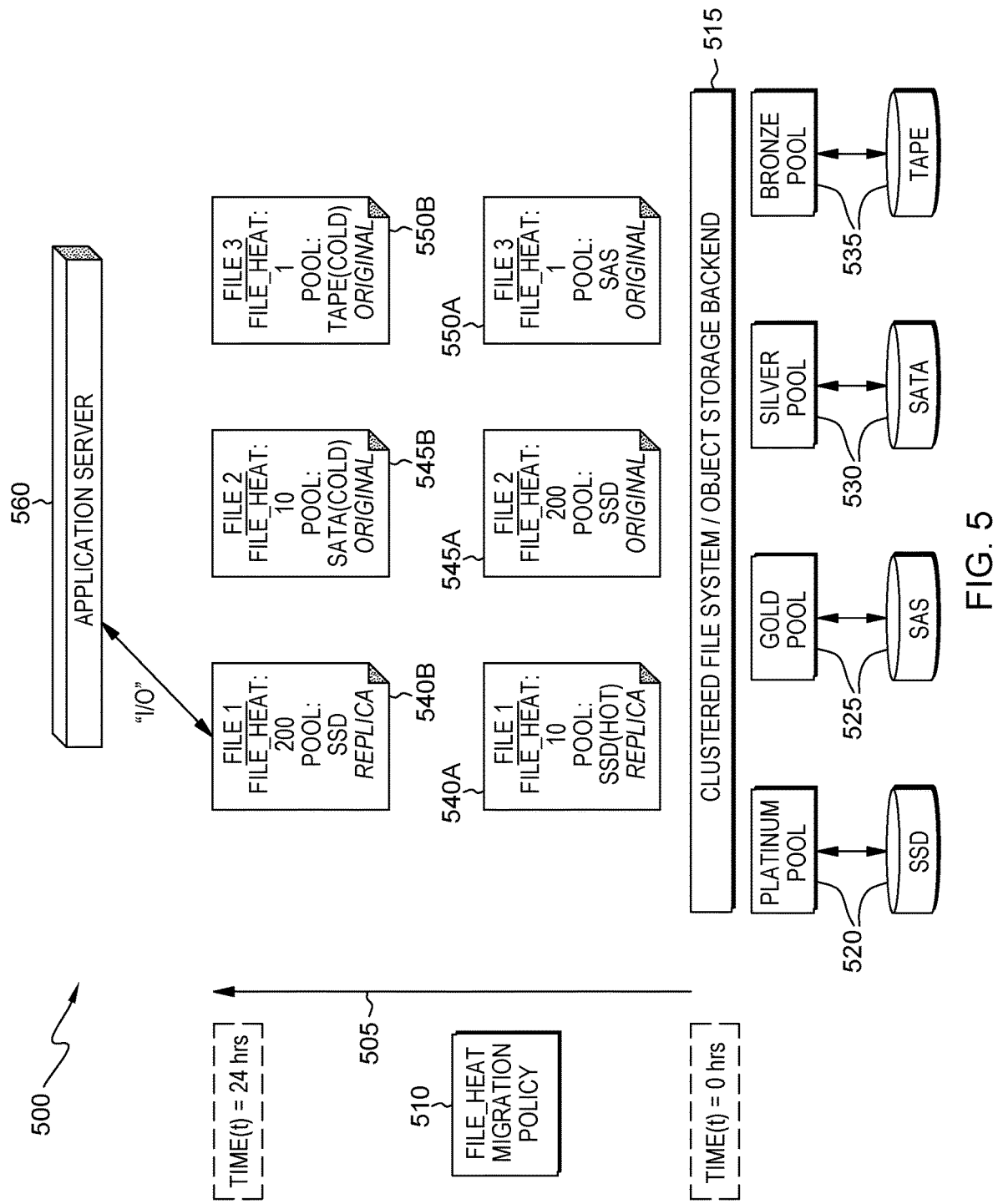
FIG. 5 is a functional block diagram illustrating a migration, where traditional object storage architecture is applied, in accordance with an embodiment of the present invention.

FIG. 5 is a functional block diagram illustrating migration where traditional object storage architecture is applied, in accordance with an embodiment of the present invention.

More specifically, a typical example demonstrating FILE_HEAT based migration where traditional object storage architecture is applied, is designated as environment 500.

Environment 500 includes: (i) a set of data files (i.e., files 540A, 545A, 550A, 540B, 545B, and 550B); (ii) a data/object storage platform (i.e., cluster file system/object storage backend 515); (iii) time axis 505 from Time=0 hrs to Time=24 hrs; (iv) a migration policy (i.e., FILE_HEAT migration policy 510); storage tiers (i.e., tier 520, tier 525, tier 530, and tier 535); and application server 560.

In FILE_HEAT based migration, there typically exists a monitoring interval (which is 24 hrs in this example). During this monitoring interval, the access rate per file is monitored. Files with a higher FILE_HEAT (access rate) when compared to other files, are migrated to a faster storage tier. Application server 560 accesses file 540B as depicted by line "I/O" wherein "I/O" are I/O requests (described above).

The storage tiers within environment 500 vary in tier level where the relative speed of the tiers is: tier 520 (fastest storage tier)>tier 525>tier 530>tier 535 (slowest storage tier). Tier 520 (i.e., the fastest storage tier) is associating a platinum pool to SSD storage. Tier 525 is associating a gold pool to SAS storage. Tier 530 is associating a silver pool to SATA storage. Tier 535 is associating a bronze pool to TAPE storage.

File 540B represents the same object replica of file 540A, wherein file 540B is processed at a different time than file 540A. File 545B represents the same original object of file 545A, wherein file 545B is processed at a different time than file 545A. File 550B represents the same object replica as File 550A, wherein file 550B is processed at a different time than file 550A.

Files 540A, 545A, and 550A are processed at an initial time (time=0 hrs) whereas files 540B, 545B, and 550B are processed 24 hours after the initial time (time=24 hrs). At the initial time, based on the data placement logic of a file system (which can be user programmable and file placement depends on access frequency, file type etc.), file 540A is placed on tier 520, file 545A is placed on tier 520, and file 550A is placed on tier 525. At the time 24 hours past the initial time, file 540B is placed on tier 520, file 545B is placed on tier 530, and file 550B is placed on tier 535. At the time 24 hours past the initial time, file 540A's FILE_HEAT is relatively compared to the change in FILE_HEAT of the other example files depicted in FIG. 5. Based on the FILE_HEAT increase, colder data becomes hotter data as demonstrated by file 540A (which has a FILE_HEAT of 10) becoming file 540B (which has a FILE_HEAT of 200) as time progressed. Thus, file 540B remains in tier 520 (i.e., the fastest storage tier) as file 540A was in tier 520 (i.e., the fastest storage tier). Based on the FILE_HEAT decrease, hotter data becomes colder data as demonstrated by file 545A (which has a FILE_HEAT of 200) becoming file 545B (which has a FILE_HEAT of 10) as time progressed. Thus, file 545B migrates to a slower tier 530 from file 545A's storage on tier 520. The FILE_HEAT of 550B does not change in comparison to the FILE_HEAT of 550A as opposed to the FILE_HEAT of 540B increasing in comparison to the FILE_HEAT of file 540A. Since the difference of the FILE_HEAT between file 550B and file 550A (i.e., $\Delta=0$) is less than the difference of the FILE_HEAT between file 540B and file 540A (i.e., $\Delta=190$), file 550B migrates to a slower tier 545 from file 550A's storage on tier 525.

Figure 6:
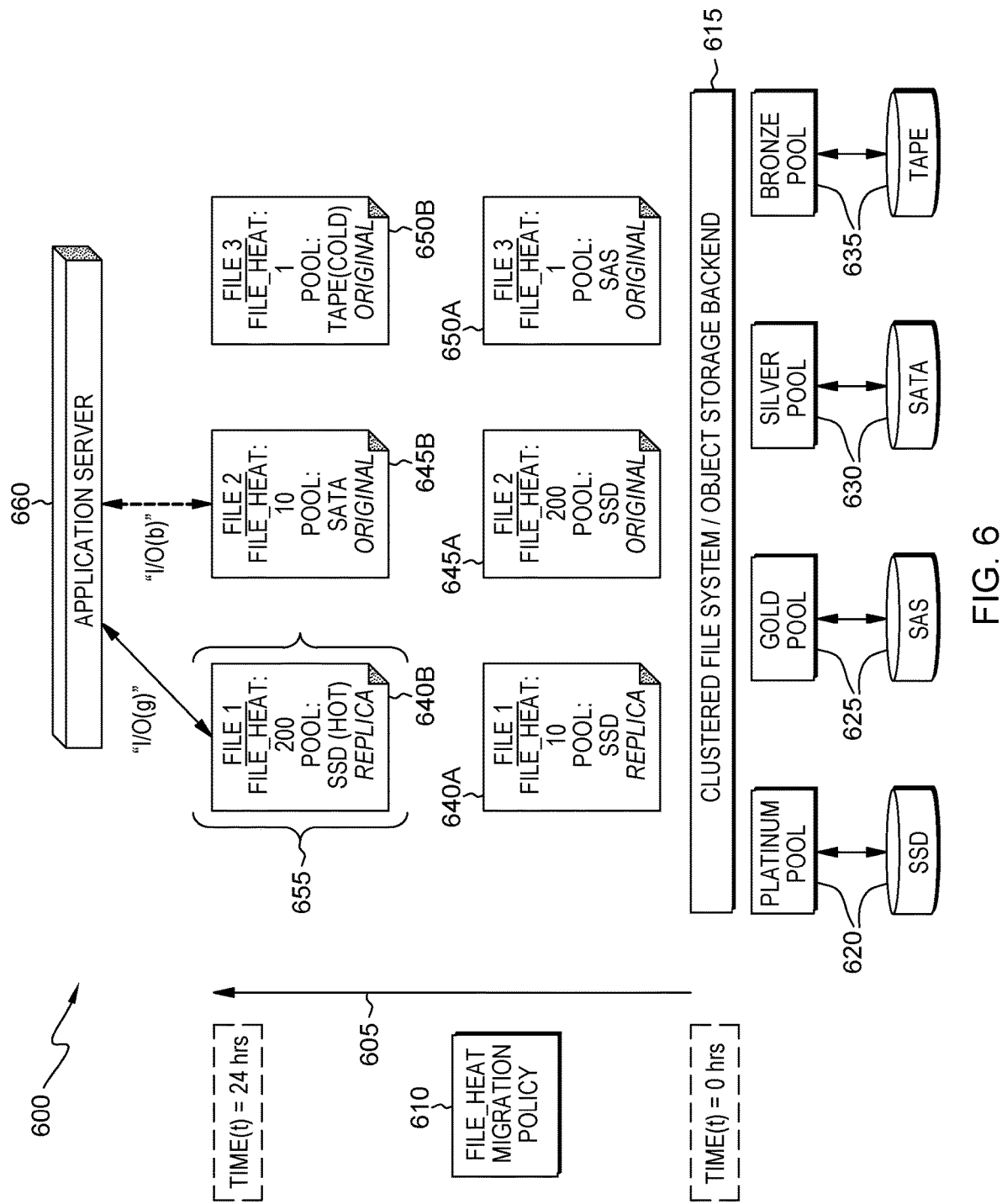
FIG. 6 is a functional block diagram illustrating system performance suffering due to migration of replicas of objects to lower storage tiers in traditional storage object architectures, in accordance with an embodiment of the present invention.

FIG. 6 is a functional block diagram illustrating system performance suffering due to the migration of replicas of objects to lower storage tiers in traditional storage object architectures, in accordance with an embodiment of the present invention.

More specifically, a typical example demonstrating FILE_HEAT based migration where traditional object storage architecture is applied, is designated as environment 600.

Environment 600 includes: (i) a set of data files (i.e., files 640A, 645A, 650A, 640B, 645B, and 650B); (ii) a data/object storage platform (i.e., cluster file system/object storage backend 615); (iii) time axis 605 from Time=0 hrs to Time=24 hrs; (iv) a migration policy (i.e., FILE_HEAT migration policy 610); storage tiers (i.e., tier 620, tier 625, tier 630, and tier 635); and application server 660.

In FILE_HEAT based migration, there typically exists a monitoring interval (which is 24 hrs in this example). During this monitoring interval, the access rate per file is monitored. Files with a higher FILE_HEAT (access rate) when compared to other files, are migrated to a faster storage tier. Application server 660 accesses file 640B as depicted by line "I/O(g)" wherein "I/O(g)" are I/O processes (described above). Application server 660 accesses file 645B as depicted "I/O(b)", wherein "I/O(b)" are I/O processes (described above).

Line "I/O(g)" represents application server 660 performing I/O processes on file 640B which is determined to be the more efficient pathway and desired access pathway for requested I/O processes. File 640B resides on tier 620 (which provides the fastest access rate). Line "I/O(b)" represents application server 660 performing I/O processes on file 645B which determined to be an inefficient pathway and desired access pathway for requested I/O processes (where file 640B node is not accessible). File 645B resides on tier 630 (which provides a slower access rate). The performance of application server 660 suffers as a consequence of file 640B not being accessible (which is further denoted by brackets 655 around file 640B).

The storage tiers within environment 600 vary in tier level where the relative speed of the tiers is: tier 620 (fastest storage tier)>tier 625>tier 630>tier 635 (slowest storage tier). Tier 620 (i.e., the fastest storage tier) is associating a platinum pool to SSD storage. Tier 625 is associating a gold pool to SAS storage. Tier 630 is associating a silver pool to SATA storage. Tier 635 is associating a bronze pool to TAPE storage.

File 640B represents the same object replica of file 640A, wherein file 640B is processed at a different time than file 640A. File 645B represents the same original object of file 645A, wherein file 645B is processed at a different time than file 645A. File 650B represents the same object replica as file 650A, wherein file 650A is processed at a different time than file 650A.

Files 640A, 645A, and 650A are processed at an initial time (time=0 hrs) whereas files 640B, 645B, and 650B are processed 24 hours after the initial time (time=24 hrs). At the initial time, based on the data placement logic of a file system (which can be user programmable and placement depends on access frequency, file type etc.), file 640A is placed on tier 620, file 645A is placed on tier 620, and file 650A is placed on tier 625. At the time 24 hours past the initial time, file 640B is placed on tier 620, file 645B is placed on tier 630, and file 650B is placed on tier 635. At the time 24 hours past the initial time, file 640A's FILE_HEAT is relatively compared to the change in FILE_HEAT of the other example files depicted in FIG. 6. Based on the FILE_HEAT increase, colder data becomes hotter data as demonstrated by file 640A (which has a FILE_HEAT of 10) becoming file 640B (which has a FILE_HEAT of 200) as time progressed. Thus, file 640B remains in tier 620 (i.e., the fastest storage tier) as file 640A was in tier 620 (i.e., the fastest storage tier). Based on the FILE_HEAT decrease, hotter data becomes colder data as demonstrated by file 645A (which has a FILE_HEAT of 200) becoming file 645B (which has a FILE_HEAT of 10) as time progressed. Thus, file 645B migrates to a slower tier 630 from file 645A's storage on tier 620. The FILE_HEAT of 650B does not change in comparison to the FILE_HEAT of 650A as opposed to the FILE_HEAT of 640B increasing in comparison to the FILE_HEAT of file 640A. Since the difference of the FILE_HEAT between file 650B and file 650A (i.e., Δ=0) is less than the difference of the FILE_HEAT between file 640B and file 640A (i.e., Δ=190), file 650B migrates to a slower tier 645 from file 650A's storage on tier 625.

Figure 7:
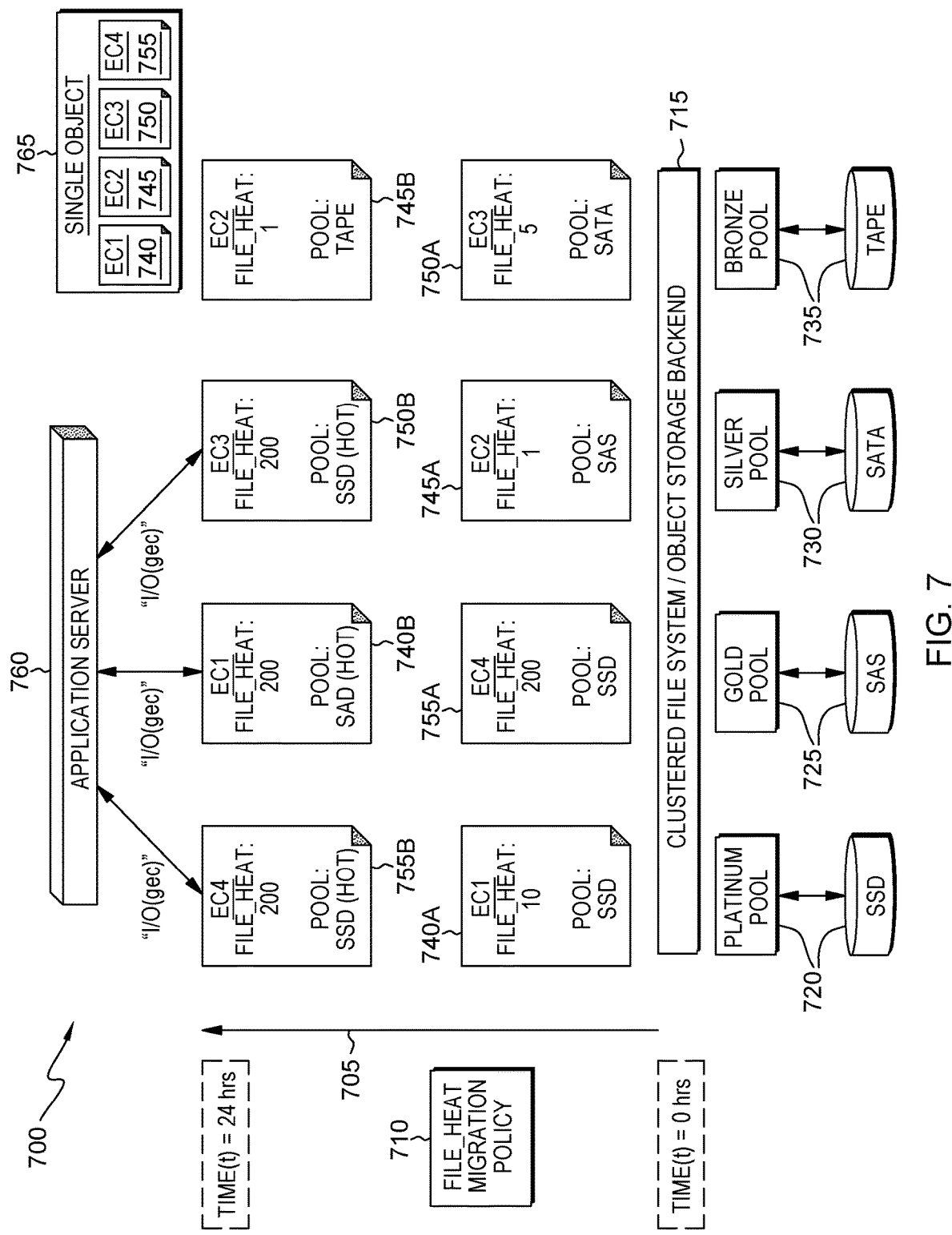
FIG. 7 is a functional block diagram illustrating a migration, where colder data migrated and hotter data migrates to a faster tier, in accordance of the present invention.

FIG. 7 is a functional block diagram illustrating a migration where colder data migrated and hotter data migrated to a faster tier, in accordance of the present invention.

More specifically, a typical example demonstrating FILE_HEAT based migration, where erasure code architecture is applied, is designated as environment 700.

Environment 700 includes: (i) a set of data files (i.e., files 740A, 740B, 745A, 745B, 750A, 750B, 755A, and 755B); (ii) a data/object storage platform (i.e., cluster file system/object storage backend 715); (iii) time axis 705 from Time=0 hrs to Time=24 hrs; (iv) a migration policy (i.e., FILE_HEAT migration policy 710); storage tiers (i.e., tier 720, tier 725, tier 730, and tier 735); application server 760; and single object 765.

In FILE_HEAT based migration, there typically exists a monitoring interval (which is 24 hrs in this example). During this monitoring interval, the access rate per file is monitored. Files with a higher FILE_HEAT (access rate) when compared to other files, are migrated to a faster storage tier. Application server 760 accesses files 755B, 740B, and 750B as depicted by lines "I/O(gec)" wherein "I/O(gec)" are I/O processes (described above).

Lines "I/O(gec)" represent application server 760 performing I/O processes on file 755B, 740B, and 750B which is determined to be the more efficient pathway and desired access pathway for requested I/O processes. The performance of application server 760 does not suffer as files 755B, 740B, and 750B reside on tier 720 (which provides the fastest access rate).

The storage tiers within environment 700 vary in tier level where the speed of the tiers is: tier 720 (fastest storage tier)>tier 725>tier 730>tier 735 (slowest storage tier). Tier 720 (i.e., the fastest storage tier) is associating a platinum pool to SSD storage. Tier 725 is associating a gold pool to SAS storage. Tier 730 is associating a silver pool to SATA storage. Tier 735 is associating a bronze pool to TAPE storage.

Single object 765 consists of erasure codes 740, 745, 750, and 755. Only three of the erasure codes are required to perform I/O processes. These required erasure codes are: erasure code 740; erasure code 755; and erasure code 750. Thus, I/O processes are performed on files 755B, 740B, and 750B.

File 740B represents the same erasure code of file 740A (i.e., erasure code 740), wherein file 740B is processed at a different time than file 740A. File 745B represents the same erasure code of file 745A (i.e., erasure code 745), wherein file 745B is processed at a different time than file 745A. File 750B represents the same erasure code as file 750A (i.e., erasure code 750), wherein file 750B is processed at a different time than file 750A. File 755B represents the same erasure code as file 755A (i.e., erasure code 755), wherein file 755B is processed at a different time than file 755A.

Files 740A, 745A, 750A and 755A are processed at an initial time (time=0 hrs) whereas files 740B, 745B, 750B and 755B are processed 24 hours after the initial time (time=24 hrs). At the initial time, based on the data placement logic of a file system (which can be user programmable and file placement depends on access frequency, file type etc.), file 740A is placed on tier 720, file 745A is placed on tier 725, file 750A is placed on tier 730, and file 755A is placed on tier 720. At the time 24 hours past the initial time, file 740B is placed on tier 720, file 745B is placed on tier 735, file 750B is placed on tier 720, and file 755B is placed on tier 720. At the time 24 hours past the initial time, file 740A's FILE_HEAT is relatively compared to the change in FILE_HEAT of the other example files depicted in FIG. 7. Colder data becoming hotter data, as time progresses, is demonstrated by: file 740A (which has a FILE_HEAT of 10) becoming file 740B (which has a FILE_HEAT of 200); and file 750A (which has a FILE_HEAT of 5) becoming file 750B (which has a FILE_HEAT of 200). Hotter data migrating to faster tiers, as time progresses, is demonstrated by: file 750A (which is on a slower tier 730) becomes file 750B (which is on a tier 720). Tier 720 is the platinum pool and tier 730 is the silver pool. Thus, this migration has demonstrated with time that file 750B has moved to a faster tier in comparison to file 750A based on increasing FILE_HEAT.

Figure 8:
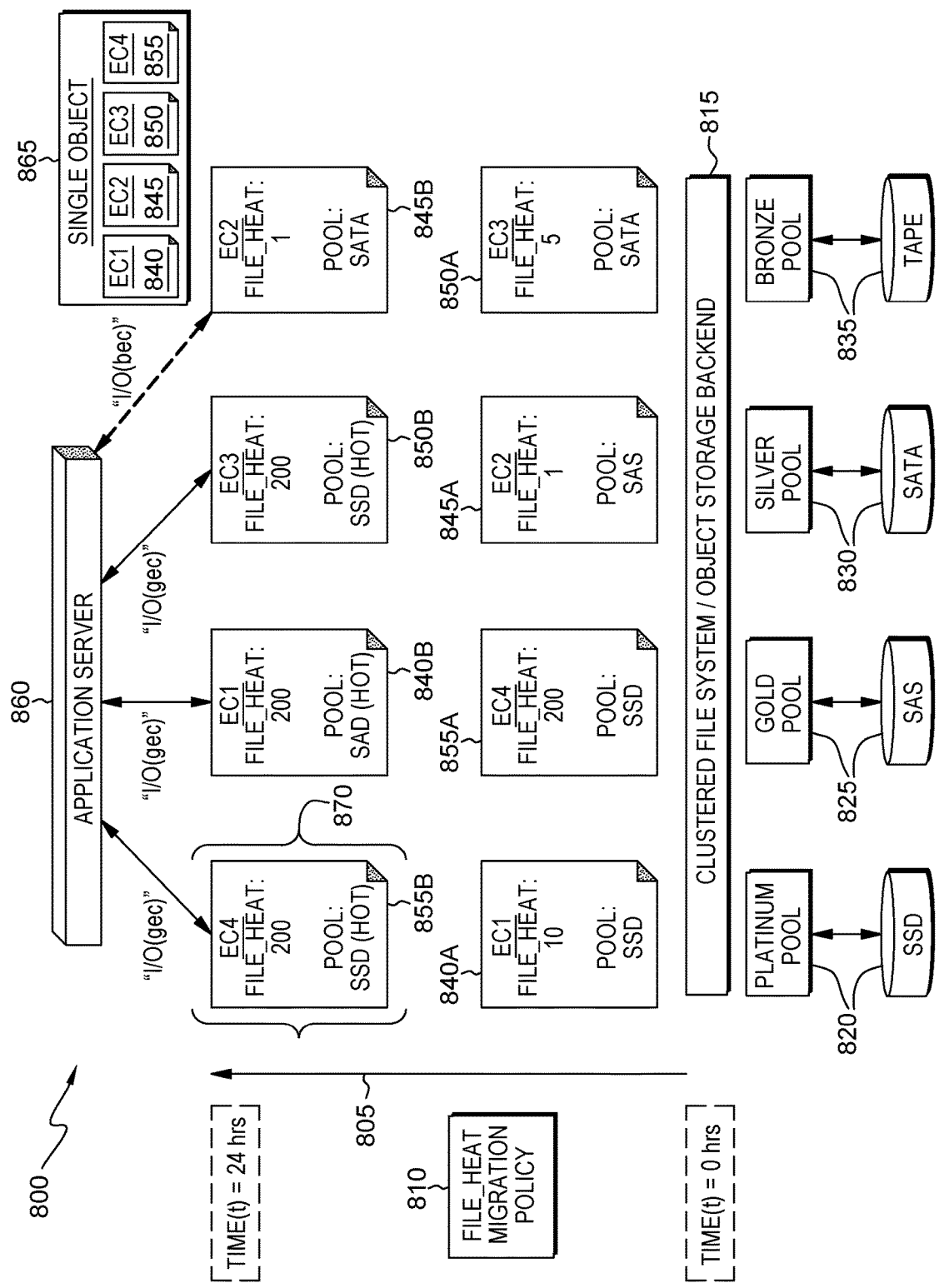
FIG. 8 is a functional block diagram illustrating system performance suffering due to migration of EC fragments to lower storage tiers in traditional storage object architectures, in accordance with an embodiment of the present invention.

FIG. 8 is a functional block diagram illustrating system performance suffering due to migration of EC fragments to lower storage tiers in traditional storage object architectures, in accordance with an embodiment of the present invention.

More specifically, a typical example demonstrating FILE_HEAT based migration, where erasure code architecture is applied, is designated as environment 800.

Environment 800 includes: (i) a set of data files (i.e., files 840A, 840B, 845A, 845B, 850A, 850B, 855A, and 855B); (ii) a data/object storage platform (i.e., cluster file system/object storage backend 815); (iii) time axis 805 from Time=0 hrs to Time=24 hrs; (iv) a migration policy (i.e., FILE_HEAT migration policy 810); storage tiers (i.e., tier 820, tier 825, tier 830, and tier 835); application server 860; and single object 865.

In FILE_HEAT based migration, there typically exists a monitoring interval (which is 24 hrs in this example). During this monitoring interval, the access rate per file is monitored. Files with a higher FILE_HEAT (access rate) when compared to other files, are migrated to a faster storage tier. Application server 860 accesses files 855B, 840B, and 850B as depicted by lines "I/O(gec)" wherein "I/O(gec)" are I/O processes (described above).

Lines "I/O(gec)" represent application server 860 performing I/O processes on file 855B, 840B, and 850B which is determined to be the more efficient pathway and desired access pathway for requested I/O processes. File 855B resides on tier 820 (which provides the fastest access rate). Line "I/O(bec)" represents application server 860 performing I/O processes on file 845B which determined to be an inefficient pathway and desired access pathway for requested I/O processes. File 845B resides on tier 830 (which provides slower access rate). The performance of application server 860 suffers as a consequence of file 855B not being accessible (which is further denoted by brackets 870 around file 855B).

The storage tiers within environment 800 vary in tier level where the relative speed of the tiers is: tier 820 (fastest storage tier)>tier 825>tier 830>tier 835 (slowest storage tier). Tier 820 (i.e., the fastest storage tier) is associating a platinum pool to SSD storage. Tier 825 is associating a gold pool to SAS storage. Tier 830 is associating a silver pool to SATA storage. Tier 835 is associating a bronze pool to TAPE storage.

Single object 865 consists of erasure codes 840, 845, 850, and 855. Only three of the erasure codes are needed to perform I/O processes. These needed erasure codes are: erasure code 840; erasure code 855; and erasure code 850. Thus, lines "I/O(gec)" point at files 855B, 840B, and 850B.

File 840B represents the same erasure code of file 840A (i.e., erasure code 840), wherein file 840B is processed at a different time than file 840A. File 845B represents the same erasure code of file 845A (i.e., erasure code 845), wherein file 845B is processed at a different time than file 845A. File 850B represents the same erasure code as file 850A (i.e., erasure code 850), wherein file 850B is processed at a different time than file 850A. File 855B represents the same erasure code as file 855A (i.e., erasure code 855), wherein file 855B is processed at a different time than file 855A.

Files 840A, 845A, 850A and 855A are processed at an initial time (time=0 hrs) whereas files 840B, 845B, 850B and 855B are processed 24 hours after the initial time (time=24 hrs). At the initial time, based on the data placement logic of a file system (which can be user programmable and file placement depends on access frequency, file type etc.), file 840A is placed on tier 820, file 845A is placed on tier 825, file 750A is placed on tier 830, and file 855A is placed on tier 820. At the time 24 hours past the initial time, file 840B is placed on tier 820, file 845B is placed on tier 835, file 850B is placed on tier 830, and file 855B is placed on tier 820. At the time 24 hours past the initial time, file 840A's FILE_HEAT is relatively compared to the change in FILE_HEAT of the other example files depicted in FIG. 8. Colder data becoming hotter data, as time progresses, is demonstrated by: file 840A (which has a FILE_HEAT of 10) becoming file 840B (which has a FILE_HEAT of 800); and file 850A (which has a FILE_HEAT of 5) becoming File 850B (which has a FILE_HEAT of 200). Hotter data migrating to faster tiers, as time progresses, is demonstrated by: file 850A (which is on the slower tier 830) becoming file 850B (which is on the faster tier 820). Tier 820 is the platinum pool and tier 830 is the silver pool. Thus, this migration has demonstrated with time that file 850B has moved to a faster tier in comparison to file 850A, based on increasing FILE_HEAT.

Figure 9:
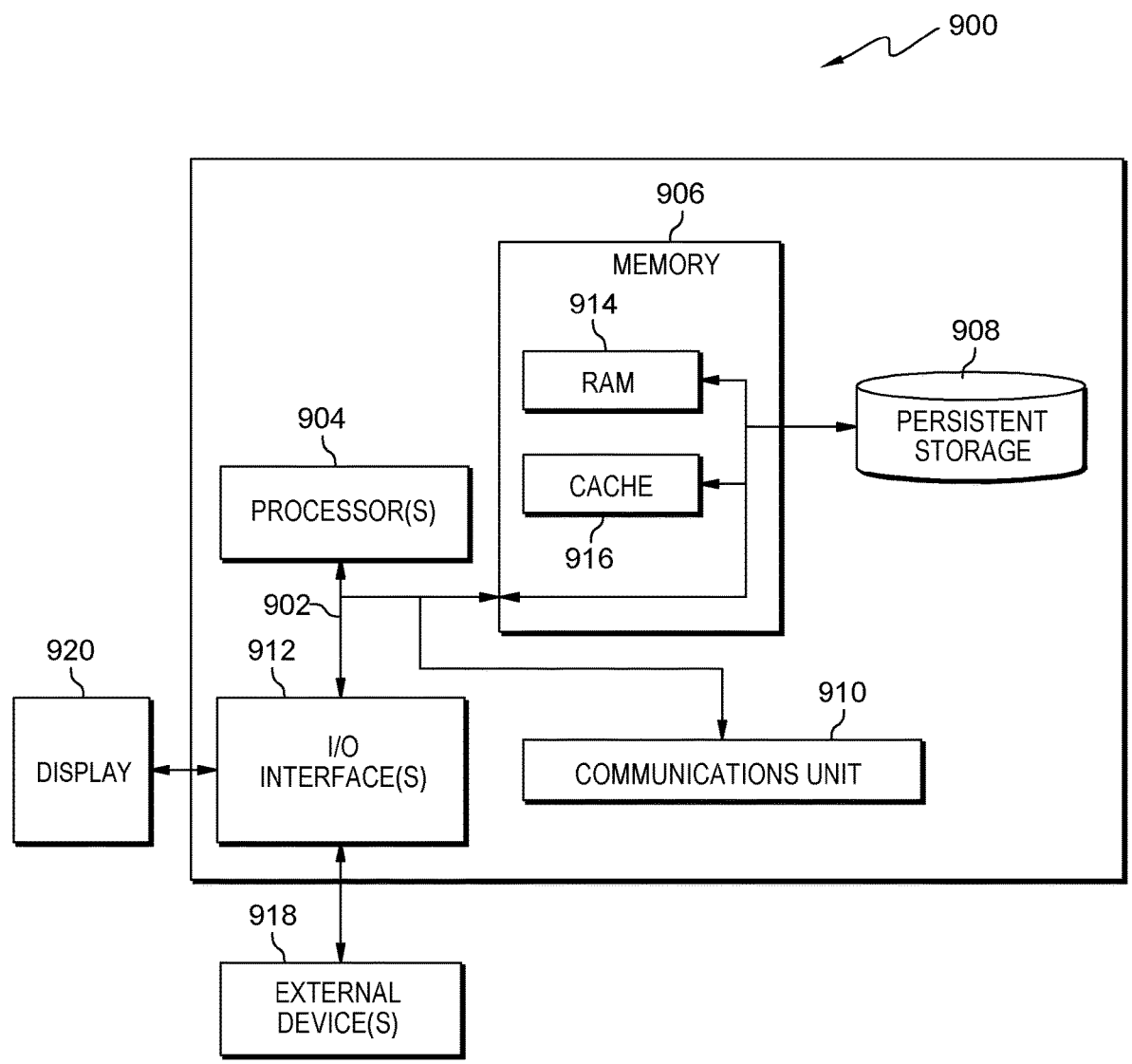
FIG. 9 depicts a block diagram of internal and external components of a computing device, in accordance with an embodiment of the present invention.

FIG. 9 depicts a block diagram of components of a computing device, generally designated 900, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Computing device 900 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer readable storage media. In this embodiment, memory 906 includes random access memory (RAM) 914 and cache memory 916. In general, memory 906 can include any suitable volatile or non-volatile computer readable storage media.

Program instructions and data used to practice embodiments of the present invention may be stored in persistent storage 908 for execution and/or access by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Program instructions and data used to practice embodiments of the present invention may be downloaded to persistent storage 908 through communications unit 910.

I/O interface(s) 912 allows for input and output of data with other devices that may be connected to computing device 900. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 908 via I/O interface(s) 912. I/O interface(s) 912 also connect to a display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for object storage, comprising:
   connecting, by one or more processors, a plurality of files to an application, wherein the application manipulates an object;
   connecting, by one or more processors, the application to a plurality of tiered storage levels, wherein the plurality of tiered storage levels comprise a plurality of proxy nodes associated with a respective plurality of storage nodes;
   transiting, by one or more processors, the object from a load balancer to the plurality of tiered storage levels through a middleware unit and a ring structure, wherein the ring structure is a first algorithm that partitions a file-clustered content into a plurality of parts;
   replicating, by one or more processors, the object to a replicated plurality of objects, wherein the replicated plurality of objects reside in the respective plurality of storage nodes;
   monitoring during a monitoring interval, by one or more processors, heat values of a replica of the object based on a plurality of erasure codes, and a parity of the object using a second algorithm;
   identifying, by one or more processors, the replicated plurality of objects and a plurality of erasure code fragments based on reading and writing patterns of the replicated plurality of objects;
   identifying, by one or more processors, the plurality of erasure code fragments corresponding to the object;
   furnishing, by one or more processors, a unique data stream through the second algorithm, wherein the unique data stream derives from the plurality of erasure codes and the file-clustered content;
   responsive to furnishing the unique data stream, completing, by one or more processors, requests for the plurality of erasure codes;
   responsive to completing the requests for the plurality of erasure codes, migrating, by one or more processors, the plurality of files to the plurality of tiered storage levels corresponding to the object based on a heat value of the plurality of files associated with the object, wherein the heat value is associated with an access temperature comprising an exponential moving average of the accesses to a file within the plurality of files based on which it is determined whether the file is hot or cold; and
   responsive to the heat values of the replica of the object and heat values of a first portion of the plurality of erasure code fragments increasing, simultaneously migrating, by one or more processors, the object and the first portion of the plurality of erasure code fragments associated with higher heat values together with the replica of the object and a second portion of the plurality of erasure code fragments associated with lower heat values to the higher tiered storage levels of the plurality of tiered storage levels based on a FILE_HEAT migration policy associated with the access temperature, wherein the migration is performed even when the heat values of the replica of the object and heat values of the second portion of the plurality of erasure code fragments are cold, the FILE_HEAT migration policy managing the plurality of parts.

2. The method of claim 1, wherein furnishing the unique data stream, comprises:
   applying, by one or more processors, the second algorithm in conjunction with a migration policy in order to migrate a plurality of objects from a first storage object storage architecture to a second object storage architecture; and
   converting, by one or more processors, data content associated with the replicated plurality of objects from the second object storage architecture and the file-clustered content into a set of modified data content, wherein the set of modified data content is the unique data stream.

3. The method of claim 2, further comprises distributing, by one or more processors, the set of modified data content across a plurality of storage nodes containing the replicated plurality of objects.

4. The method of claim 1, further comprising:
   identifying, by one or more processors, the replicated plurality of objects and the plurality of erasure coded fragments as having a high heat value or a low heat value, wherein high heat values are indicative of a frequently accessed plurality of files associated with the replicated plurality of objects.

5. The method of claim 1, further comprising:
   responsive to determining the replicated plurality of objects and the accompanying erasure code fragments is migrated to the higher tiered storage levels, overriding, by one or more processors, the migration policy which prohibits the migration of the replicated plurality of objects and the accompanying erasure code fragments to the higher tiered storage levels.

6. A computer program product for object storage, comprising:
   a computer readable storage medium and program instructions stored on the computer readable storage medium, the program instructions comprising:
   program instructions to connect a plurality of files to an application, wherein the application manipulates an object;
   program instructions to connect the application to a plurality of tiered storage levels, wherein the plurality of tiered storage levels comprise a plurality of proxy nodes associated with a respective plurality of storage nodes;
   program instructions to transit the object from a load balancer to the plurality of tiered storage levels through a middleware unit and a ring structure, wherein the ring structure is a first algorithm that partitions a file-clustered content into a plurality of parts;
   program instructions to replicate the object to a replicated plurality of objects, wherein the replicated plurality of objects reside in a respective plurality of storage nodes;

program instructions to monitor, during a monitoring interval, heat values of a replica of the object based on a plurality of erasure codes, and a parity of the object using a second algorithm;

program instructions to identify the replicated plurality of objects and a plurality of erasure code fragments based on reading and writing patterns of the replicated plurality of objects;

program instructions to identify the plurality of erasure code fragments corresponding to the object;

program instructions to furnish a unique data stream through the second algorithm, wherein the unique data stream derives from the plurality of erasure codes and file-clustered content;

responsive to furnishing the unique data stream, program instructions to complete requests for the plurality of erasure codes;

responsive to completing the requests for the plurality of erasure code, program instructions to migrate the plurality of files to the plurality of tiered storage levels corresponding to the object based on a heat value of the plurality of files associated with the object, wherein the heat value is associated with an access temperature comprising an exponential moving average of the accesses to a file within the plurality of files based on which it is determined whether the file is hot or cold; and responsive to the heat values of the replica of the object and heat values of a first portion of the plurality of erasure code fragments increasing, program instructions to simultaneously migrate the object and the first portion of the plurality of erasure code fragments associated with higher heat values together with the replica of the object and a second portion of the plurality of erasure code fragments associated with lower heat values to the higher tiered storage levels of the plurality of tiered storage levels based on a FILE_HEAT migration policy associated with the access temperature, wherein the migration is performed even when the heat values of the replica of the object and heat values of the second portion of the plurality of erasure code fragments are cold, the FILE_HEAT migration policy managing the plurality of parts.

7. The computer program product of claim 6, wherein program instructions to furnish the unique data stream, comprise:

program instructions to apply the second algorithm in conjunction with a migration policy in order to migrate a plurality of objects from a first storage object storage architecture to a second object storage architecture; and program instructions to convert data content associated with the replicated plurality of objects from the second object storage architecture and the file-clustered content into a set of modified data content, wherein the set of modified data content is the unique data stream.

8. The computer program product of claim 7, further comprises program instructions to distribute the set of modified data content across a plurality of storage nodes containing the replicated plurality of objects.

9. The computer program product of claim 6, further comprising:

program instructions to identify the replicated plurality of objects and the plurality of erasure coded fragments as having a high heat value or a low heat value, wherein high heat values are indicative of a frequently accessed plurality of files associated with the replicated plurality of objects.

10. The computer program product of claim 6, further comprising:

responsive to determining the replicated plurality of objects and the accompanying erasure code fragments is migrated to the higher tiered storage levels, program instructions to override the migration policy which prohibits the migration of the replicated plurality of objects and the accompanying erasure code fragments to the higher tiered storage levels.

11. A computer system for object storage, comprising:
one or more computer processors;
one or more computer readable storage media;
program instructions stored on the one or more computer readable storage media for execution by at least one of the one or more processors, the program instructions comprising:

program instructions to connect a plurality of files to an application, wherein the application manipulates an object;

program instructions to connect the application to a plurality of tiered storage levels;

program instructions to replicate the object to a replicated plurality of objects, wherein the replicated plurality of objects reside in a respective plurality of storage nodes, wherein the plurality of tiered storage levels comprise a plurality of proxy nodes associated with a respective plurality of storage nodes;

program instructions to transit the object from a load balancer to the plurality of tiered storage levels through a middleware unit and a ring structure, wherein the ring structure is a first algorithm that partitions a file-clustered content into a plurality of parts;

program instructions to monitor, during a monitoring interval, heat values of a replica of the object based on a plurality of erasure codes, and a parity of the object using a second algorithm;

program instructions to identify the replicated plurality of objects and a plurality of erasure code fragments based on reading and writing patterns of the replicated plurality of objects;

program instructions to identify the plurality of erasure code fragments corresponding to the object;

program instructions to furnish a unique data stream through the second algorithm, wherein the unique data stream derives from the plurality of erasure codes and file-clustered content;

responsive to furnishing the unique data stream, program instructions to complete requests for the plurality of erasure codes;

responsive to completing the requests for the plurality of erasure code, program instructions to migrate the plurality of files to the plurality of tiered storage levels corresponding to the object based on a heat value of the plurality of files associated with the object, wherein the heat value is associated with an access temperature comprising an exponential moving average of the accesses to a file within the plurality of files based on which it is determined whether the file is hot or cold; and responsive to the heat values of the replica of the object and heat values of a first portion of the plurality of erasure code fragments increasing, program instructions to simultaneously migrate the object and the first portion of the plurality of erasure code fragments associated with higher heat values together with the replica of the object and a second portion of the plurality of erasure code fragments associated with lower heat values to the higher tiered storage levels of the plurality of tiered storage levels based on a FILE_HEAT migration policy associated with the access temperature, wherein the migration is performed even when the heat values of the replica of the object and heat values of the second portion of the plurality of erasure code fragments are cold, the FILE_HEAT migration policy managing the plurality of parts.

12. The computer system of claim 11, wherein program instructions to furnish the unique data stream, comprise:
program instructions to apply the second algorithm in conjunction with a migration policy in order to migrate a plurality of objects from a first storage object storage architecture to a second object storage architecture; and
program instructions to convert data content associated with the replicated plurality of objects from the second object storage architecture and the file-clustered content into a set of modified data content, wherein the set of modified data content is the unique data stream.

13. The computer system of claim 11, further comprising:
program instructions to identify the replicated plurality of objects and the plurality of erasure coded fragments as having a high heat value or a low heat value, wherein high heat values are indicative of a frequently accessed plurality of files associated with the replicated plurality of objects.

14. The computer system of claim 11, further comprising:
responsive to determining the replicas of the replicated plurality of objects and the accompanying erasure code fragments is migrated to the higher tiered storage levels, overriding, by one or more processors, the migration policy which prohibits the migration of the replicas of the replicated plurality of objects and the accompanying erasure code fragments to the higher tiered storage levels.

* * * * *